(12) United States Patent
Kruglick

(10) Patent No.: US 8,422,792 B2
(45) Date of Patent: Apr. 16, 2013

(54) ANGLE INVARIANT VISUAL ANALYSIS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 281 days.

(21) Appl. No.: 13/003,717

(22) PCT Filed: Aug. 24, 2010

(86) PCT No.: PCT/US2010/046471
§ 371 (c)(1),
(2), (4) Date: Jan. 11, 2011

(87) PCT Pub. No.: WO2012/026923
PCT Pub. Date: Mar. 1, 2012

(65) Prior Publication Data
US 2012/0051639 A1 Mar. 1, 2012

(51) Int. Cl.
*G06K 9/00* (2006.01)
(52) U.S. Cl.
USPC ............ 382/199; 382/287; 382/162; 358/530
(58) Field of Classification Search .................... 382/287
See application file for complete search history.

(56) References Cited

U.S. PATENT DOCUMENTS

| | | | | |
|---|---|---|---|---|
| 2002/0060819 A1* | 5/2002 | Nara | ............................. | 358/530 |
| 2003/0215131 A1* | 11/2003 | Lee et al. | ..................... | 382/162 |
| 2005/0180635 A1* | 8/2005 | Trifonov et al. | .............. | 382/199 |
| 2008/0019611 A1 | 1/2008 | Larkin et al. | | |
| 2009/0085933 A1* | 4/2009 | Chen et al. | .................... | 345/650 |
| 2009/0297055 A1 | 12/2009 | Panda | | |

OTHER PUBLICATIONS

International Search Report and Written Opinion for International Application No. PCT/US10/46471, mailed on Nov. 30, 2010.
Aura Conci, et al "Multi-bands image analysis using local fractal dimension" Computer Graphics and Image Processing, Brazilian Symposium on, vol. 0 (Los Alamitos, CA, USA: IEEE Computer Society, 2001), 91.
B. B. Chaudhuri, et al "Texture Segmentation Using Fractal Dimension," IEEE Trans. Pattern Anal. Mach. Intell. 17, No. 1 (1995) 72-77.

* cited by examiner

*Primary Examiner* — Hadi Akhavannik
(74) *Attorney, Agent, or Firm* — Maschoff Brennan

(57) ABSTRACT

Technologies are generally described for performing image analysis of an image using a repeating geometric sequence. In some examples, a computing system accesses image data that defines an image for image analysis. The computing system determines a repeating geometric sequence that generates variously oriented edges or sub-regions in the image data. The computing system applies the repeating geometric sequence to the image data, thereby generating a series of coordinates that represent the image data defined by the variously oriented edges or sub-regions. The coordinates are determined by the variously oriented edges or sub-regions and not by horizontal or vertical Cartesian lines. The computing system organizes the image data represented by the series of coordinates into a set of one or more arrays and performs image analysis on the set of one or more arrays to produce an image analysis result for the image data.

20 Claims, 5 Drawing Sheets

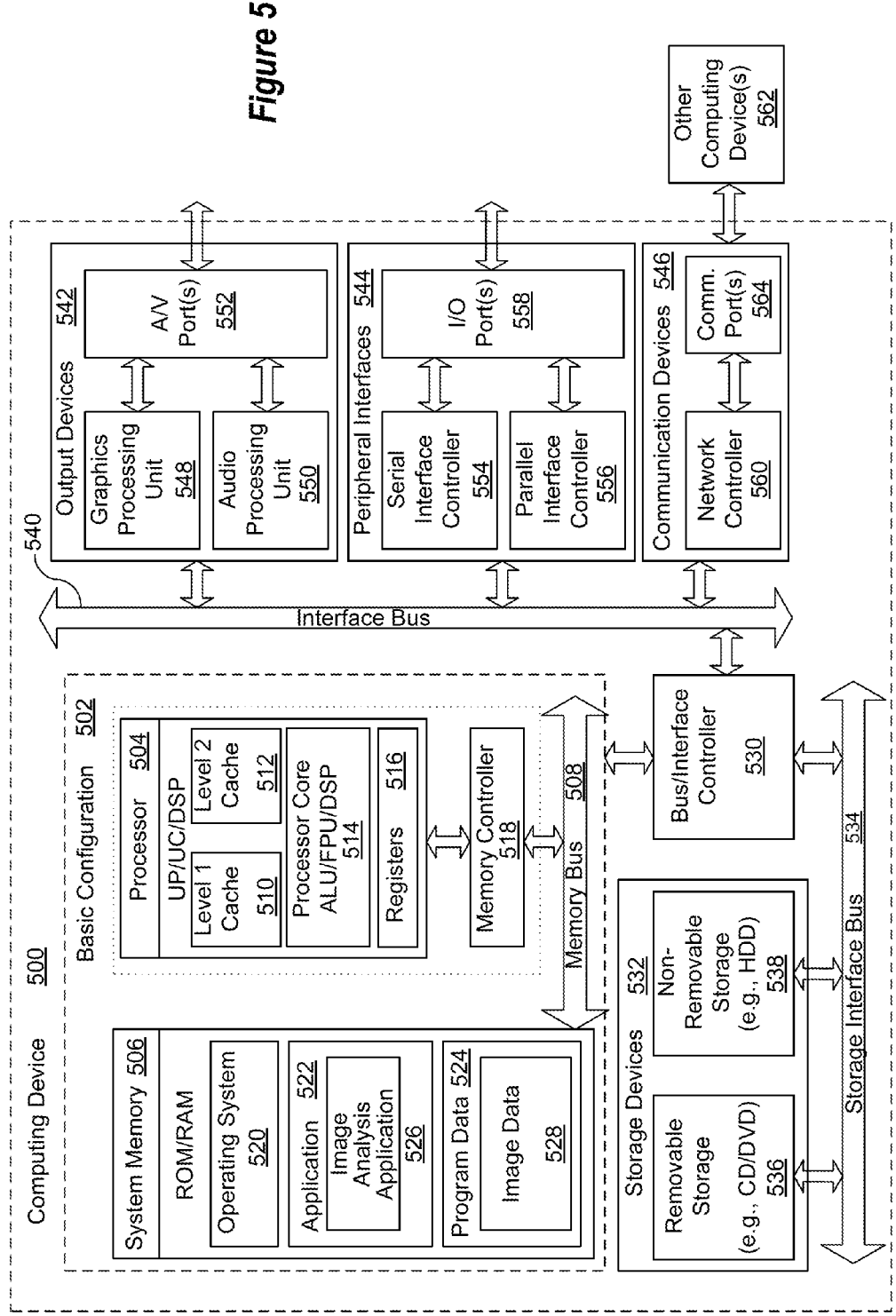

ANGLE INVARIANT VISUAL ANALYSIS

BACKGROUND

Conventional techniques for texture and material analysis for visual image data are generally performed along sub-regions or lines that align with the X or Y axes of the image. Unfortunately, aligning with the X or Y axes introduces many problems in the image analysis. For example, sharp edges in an image, such as seams, paper edges, or shadows, exist in the real world and tend to distort the underlying image data of the image. Consequently, when texture and material analysis is performed along the X or Y axes of the image on image data that includes sharp edges, the result may not be reliable, as the sharp edges tend to not show up at all or to show up in a much greater degree than they should.

In addition, when the viewing angle of the image changes, the sharp edges cause the image data to change. The relationship between the sharp edges and the viewing angle changes also changes under these circumstances. This also leads to inaccurate results when performing image analysis on the underlying image data of the image.

SUMMARY

An illustrative embodiment disclosed herein relates to a method and computer program product for a computing system to perform image analysis of an image using a repeating geometric sequence. The computing system accesses image data that defines an image for image analysis. The computing system determines a repeating geometric sequence that will generate variously oriented edges or sub-regions in the image data. The computing system applies the repeating geometric sequence to the image data, generating a series of coordinates that represent the image data defined by the variously oriented edges or sub-regions. The coordinates are defined by the variously oriented edges or sub-regions and the series of coordinates are not limited to a horizontal or vertical Cartesian coordinate system. The computing system organizes the image data represented by the series of coordinates into a set of one or more arrays and performs image analysis on the set of one or more arrays to produce an image analysis result for the image data.

An illustrative embodiment disclosed herein relates to a computing system. The computing system includes a processor, a memory, computation generation module, a geometric sequence module, an application module, an organization module, and an analysis module. The access module accesses image data defining an image to be subjected to image analysis. The geometric sequence module determines a repeating geometric sequence that generates variously oriented edges or sub-regions in the image data. The application module applies the repeating geometric sequence to the image data to generate, at different angles, a series of coordinates representing image data defined by the variously oriented edges or sub-regions. The series of coordinates are defined by the variously oriented edges or sub-regions and the series of coordinates are not limited to a horizontal or vertical Cartesian coordinate system. The organization module organizes the image data represented by the series of coordinates into a set of one or more arrays. The analysis module performs image analysis on the set of one or more arrays to produce an image analysis result for the image data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
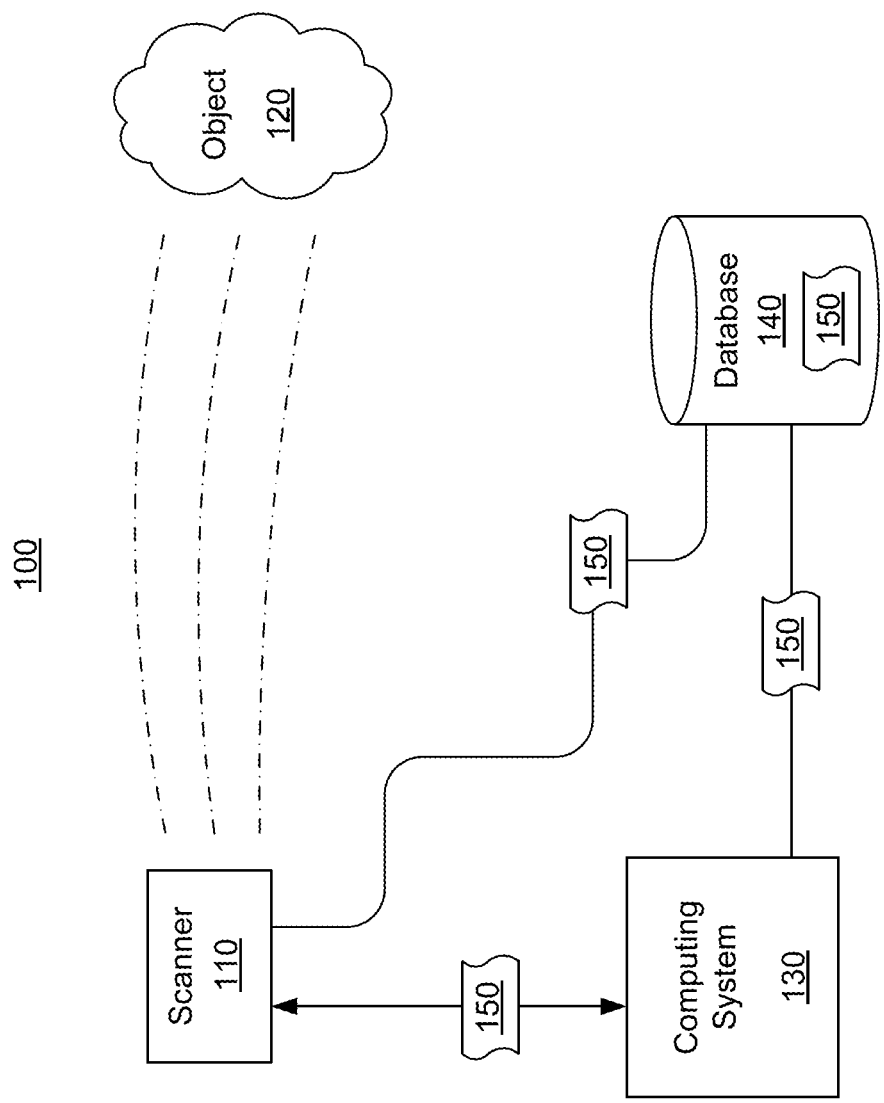
FIG. 1 is a schematic of an illustrative embodiment of an environment for obtaining image data and for performing image analysis on the image data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to a computing system that performs image data analysis. The computing system accesses image data of an image from, for example, a scanner that collects the image data or a database that stores the image data.

The computing system determines a repeating geometric sequence that generates variously oriented edges or sub-regions in the image data. The term "variously oriented" indicates that the edges or sub-regions are generated at highly varied angles, regardless of whether such highly varied angles are generated in a predetermined manner or using random or pseudorandom techniques. Among other advantages, the highly varied angles define or enclose portions of the image data at the varied angles so that image analysis need not be performed along the X or Y axes of the image.

The repeating geometric sequence, which may be a fractal pattern, is applied to the image data by the computing system. A series of coordinates are generated to represent the portion of the image data defined by the variously oriented edges or sub-regions. The series of coordinates are defined by the highly varied angles of the variously oriented edges or sub-regions and not by horizontal or vertical Cartesian lines or by perpendicular axes in other orthogonal coordinate systems. As used herein, the term "highly varied angles" refers to angles that define lines or regions that other than those that are determined solely by horizontal and vertical Cartesian lines or by perpendicular axes in other orthogonal coordinate systems. As previously mentioned, conventional systems define coordinates for image analysis along horizontal or vertical Cartesian lines. Embodiments disclosed herein are angle invariant, as the highly varied angles of the variously oriented edges or sub-regions define the coordinates for image analysis.

The computing system organizes the series of coordinates into one or more arrays and then performs image analysis on the arrays. The image analysis, since it is not tied to X or Y axes of the image, produces an image analysis result in which the effects of any sharp edges in the image data are normalized, so that the results are similar for all the varied angles.

Several illustrative embodiments of respective aspects of the present disclosure are given below by way of example with reference to the accompanying Figures. FIG. 1 is a schematic of an illustrative embodiment of an environment 100 for obtaining image data and for performing image analysis on the image data. The environment 100 according to this aspect includes a scanner 110 and an object 120. The environment 100 also includes a computing system 130 and a database 140.

In an illustrative embodiment, the scanner 110 may be any reasonable scanner or image capturing device that records image data of an object. The scanner 110 may be a ground based scanner, an airborne scanner, or a space based scanner. In some illustrative embodiments, the scanner 110 may be a camera. The scanner 110 may be coupled to the computing system 130 and the database 140 by any network or bus that is compatible with the scanner 110, the computing system 130, and the database 140. Examples of such networks include satellite networks, 802.11 networks, personal computer or enterprise networks (e.g., LAN, WAN), wireless networks (e.g., Bluetooth, WiFi), cellular networks, telephony networks (e.g., landline or PSTN), data networks, the Internet, or the like or any combination thereof.

The object 120 may be any physical object, such as a building, a factory, roads, piping or other objects that are commonly scanned by a scanner, such as the scanner 110. The object 120 may also be a natural landscape, such as a field or a mountain, or may be an elevation. One of skill in the art will appreciate that the object 120 may be any object that may be scanned by the scanner 110.

The scanner 110 may scan the object 120 to generate image data 150. The image data 150 may define an image of the object 120 in the form of raster data, vector data, or any other reasonable data format such as a JPG file. In one embodiment, the image data 150 may be provided to the computing system 130, where the image data 150 is subjected to image analysis as will be explained in more detail to follow. The image analysis may be used to create an image showing physical details of the object 120 for use by a user of the computing system 130.

In one illustrative embodiment, the scanner 110 may be set up to define scan lines that correspond to a repeating geometric sequence, such as a fractal pattern. In this way, the image data 150 that is produced by the scanner 110 may be analyzed using the repeating geometric sequence as will be explained in more detail to follow.

In an alternative embodiment, the scanner 110 may provide the image data 150 to the database 140. The database 140 can be any reasonable database that is a part of the computing system 130 or separate therefrom as shown in FIG. 1. The database 140 stores the image data 150 and provides the image data 150 to the computing system 130 for image analysis.

In an alternative embodiment, the database 140 receives image data 150 from a source other than the scanner 110. For example, image data 150 from another scanner may be stored in the database 140. The database 140 then provides the image data 150 from the other source to the computing system 130 for image analysis.

In an illustrative embodiment, the image data 150 stored in the database 140 may be subdivided into sub-regions according to a repeating geometric sequence. In this way, the image data 150 stored in the database 140 can be analyzed using the repeating geometric sequence as will be explained in more detail to follow.

Figure 2:
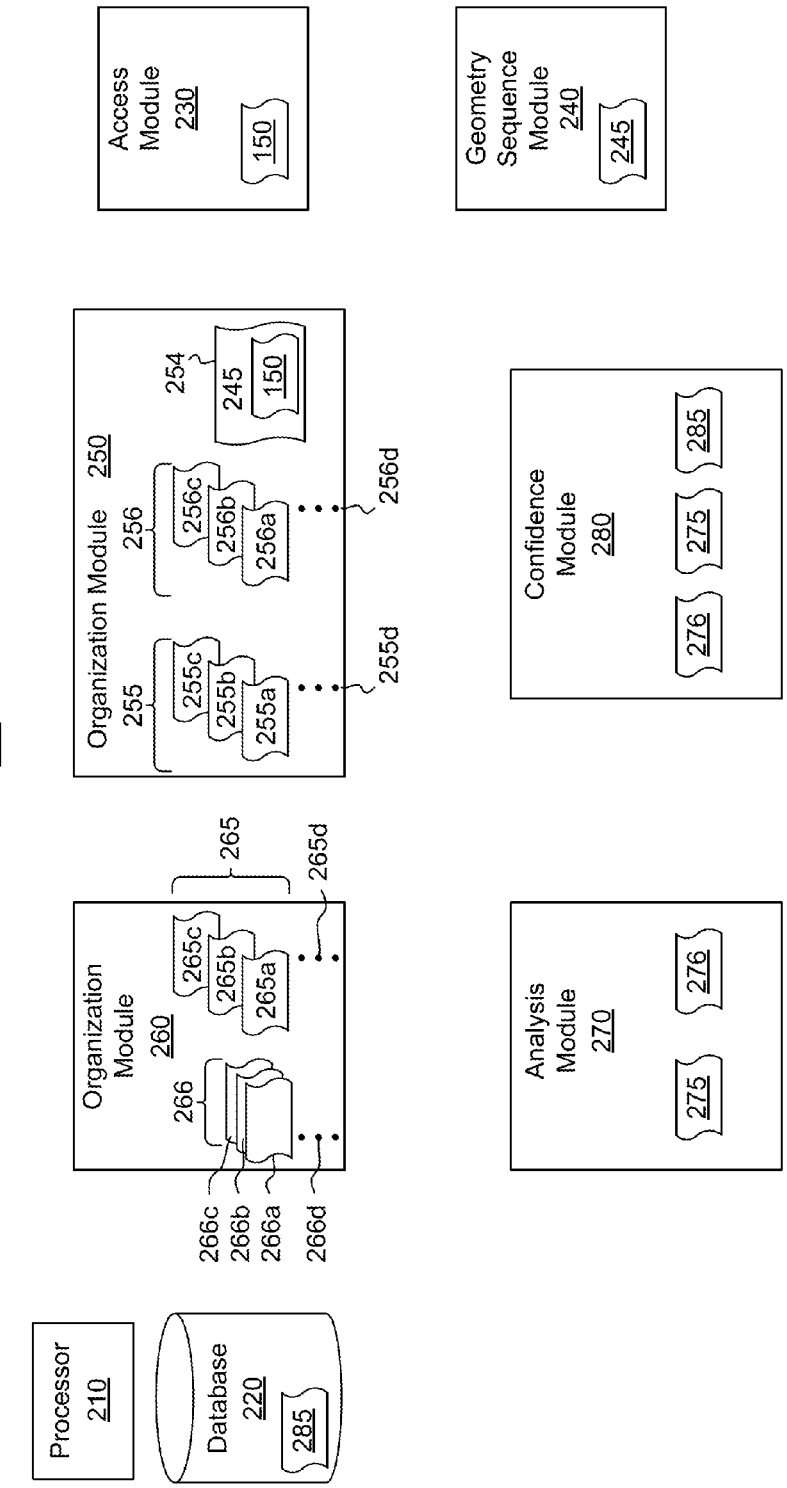
FIG. 2 is an illustrative embodiment a computing system of the environment of FIG. 1.

FIG. 2 is an illustrative embodiment of the computing system 130. As shown, the computing system 130 includes various operational modules and databases that will be explained in more detail. Although not necessarily shown as being coupled, so as to not distract from the embodiments disclosed herein, it will be understood that the various operational modules and databases of the computing system 130 may be coupled to each other by any reasonable means, such as a computer bus, other wiring, or wireless connections, as circumstances warrant. In addition, it will be understood that, although the various modules and databases of the computing system 130 are shown as being separate, this need not be the case. In some embodiments, the one or more modules or databases may be included within another module or database.

As shown, the computing system 130 includes a processor 210. The processor 210 may be any reasonable processor and, in operation, allows the computing system 130 to perform various operations, including image analysis. In some embodiments, the processor 210 may be accessed by the various operational modules of the computing system 130 to provide processing resources to the modules. In other embodiments, the operational modules may have access to an alternative processor.

The computing system 130 also includes a database 220 or other suitable data storage device or memory. The database 220 may operate in connection with any suitable non-volatile or volatile data storage medium. In one illustrative embodiment, the database 220 can be used to store information that is used during image analysis. Although the database 220 is shown as being included within the computing system 130, in some embodiments the database 220 is external to the computing system 130, while being accessible thereto. For example, the database 220 may correspond to database 140 of FIG. 1.

An access module 230 is included in the computing system 130. The access module 230 may access the image data 150 that defines the object 120. As previously described in relation to the FIG. 1, the image data 150 may be accessed from the scanner 110 when the scanner 110 scans the object 120. Alternatively, the image data 150 may be accessed from the database 140.

The computing system 130 of FIG. 2 includes a geometric sequence module 240. The geometric sequence module 240 determines a repeating geometric sequence 245 that generates variously oriented edges or sub-regions in the image data 150.

Using the repeating geometric sequence 245 to generate the variously oriented edges or sub-regions in the image data 150 produces edges or sub-regions at highly varied angles. As will be described in more detail to follow, when the edges or sub-regions at different angles are used to define data samples that will be used in image analysis, effects of sharp edges such as seams, paper edges, or shadows in the image data 150 are normalized so that the image analysis results are similar from the different angles.

In one illustrative embodiment, the repeating geometric sequence 245 may be a fractal pattern. A fractal pattern is a rough or fragmented geometric shape that can be split into parts, each of which is (at least approximately) a reduced-size copy of the whole. Many fractal patterns have a fine structure at arbitrarily small scales, are too irregular to be easily described in traditional Euclidean geometric language, have a Hausdorff dimension greater than its topological dimension, and have a simple and recursive definition. Such properties allow the fractal pattern to be used by embodiments described herein to generate the variously oriented edges or sub-regions in the image data 150.

Four common techniques for generating fractals are:

Escape-time fractals—(also known as "orbits" fractals) are defined by a formula or recurrence relation at each point in a space (such as the complex plane). Examples of this type are the Mandelbrot set, Julia set, the Burning Ship fractal, the Nova fractal and the Lyapunov fractal. The 2d vector fields that are generated by one or two iterations of escape-time formulae also give rise to a fractal form when points (or pixel data) are passed through this field repeatedly.

Iterated function systems—have a fixed geometric replacement rule. Cantor set, Sierpinski carpet, Sierpinski triangle, Peano curve, Koch snowflake, Harter-Highway dragon curve, T-Square, Menger sponge, are some examples of such fractals.

Random fractals—Generated by stochastic rather than deterministic processes, for example, trajectories of the Brownian motion, Levy flight, fractal landscapes and the Brownian tree. The latter yields so-called mass- or dendritic fractals, for example, diffusion-limited aggregation or reaction-limited aggregation clusters.

Strange attractors—Generated by iteration of a map or the solution of a system of initial-value differential equations that exhibit chaos.

The examples listed above are known to those of skill in the art and need not be described in detail here. However, how to specifically generate two of the known fractal patterns will be discussed.

For example, to generate a Sierpinski triangle, start with any triangle in a plane (any closed, bounded region in the plane will actually work). The canonical Sierpinski triangle uses an equilateral triangle with a base parallel to the horizontal axis. Shrink the triangle to ½ height and ½ width, make three copies, and position the three shrunken triangles so that each triangle touches the two other triangles at a corner. This will cause the emergence of a central hole—because the three shrunken triangles can between them cover only ¾ of the area of the original. Repeat the step with each of the smaller triangles as many iterations as needed.

To generate a Koch snowflake, start with an equilateral triangle, then recursively altering each line segment as follows:

1. Divide the line segment into three segments of equal length.
2. Draw an equilateral triangle that has the middle segment from step 1 as its base and points outward.
3. Remove the line segment that is the base of the triangle from step 2.

After one iteration of this process, the result is a shape similar to the Star of David. The Koch curve is the limit approached as the above steps are followed over and over again.

Accordingly, there are numerous known fractal patterns that are consistent with the principles described herein and can be utilized by the embodiments disclosed herein. Thus, any of the known fractal patterns may be selected for use as the repeating geometric sequence 245. In one illustrative embodiment, one or more known fractal patterns may be stored in the database 220. The geometric sequence module 240 may then determine the one of the known fractal patterns such as, by way of example, the best to apply to the image data 150. For example, if the general shape of the object 120 is unknown, then any known fractal pattern may be applied to the image data 150. In such cases, the geometric module 240 may use the known fractal pattern that is easiest to apply. Alternatively, the user of the computing system 130 may specify which fractal pattern to apply to the image data 150. Thus, as long as it will generate the variously oriented edges or sub-regions in the image data 150, any known fractal pattern may be used.

In some embodiments, however, the general shape of the object 120 may be known. For instance, the object 120 may be a generally triangular or rectangular shape. If such shape is known, the geometric sequence module 240 may determine that some fractal patterns are better suited to that shape. For example, if the object 120 is generally triangular, then a fractal pattern based on triangles such as Sierpinski triangle or Koch snowflake may be better suited. Of course, if such fractal patterns are not available to the geometric sequence module 240, then a fractal pattern that is available may be applied to the image data 150 as discussed.

Figure 3C:
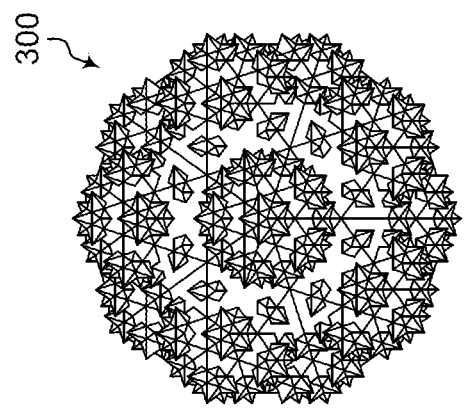
FIGS. 3A-3C show an illustrative embodiment of a Fractal pattern that may be applied to the image data.
Figure 3B:
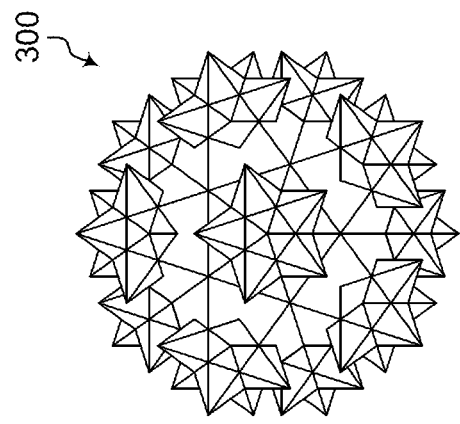
Figure 3A:
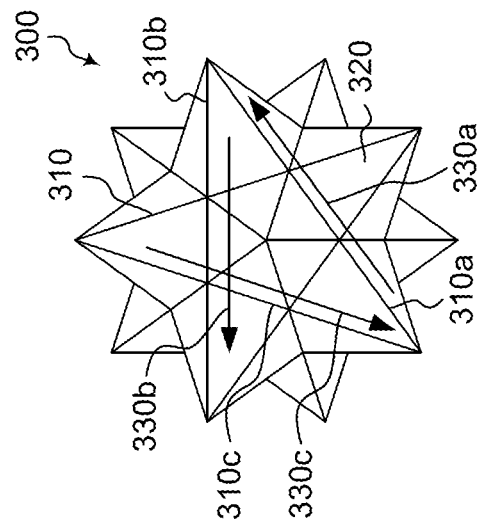

FIGS. 3A-3C illustrate an example of a fractal pattern 300 that may be used as the repeating geometric sequence 245. As shown in FIG. 3A, the fractal pattern 300 defines various variously oriented edges or lines 310, including lines 310a, 310b, and 310c, and various variously oriented sub-regions 320. As can also be seen, the variously oriented edges 310 and the variously oriented sub-regions 320 are at different angles. As such, the variously oriented edges 310 and the variously oriented sub-regions 320 are not defined by or limited to horizontal or vertical Cartesian lines.

FIG. 3A further shows lines 330a, 330b, and 330c, which can be used as sample analysis paths when generating a series of coordinates that represent the image data 150 defined by the variously oriented edges 310 or variously oriented the sub-regions 320.

FIGS. 3B and 3C illustrate the fractal pattern 300 when it has been repeated for several additional iterations. The fractal pattern 300 is divided into repeating parts that, qualitatively, are reduced-size copies of the whole. The variously oriented edges 310 and the variously oriented sub-regions 320 provide successively increasing coverage as they become smaller. The smaller variously oriented edges 310 and the smaller sub-regions 320 provide additional sampling points to generate the coordinates to be used in the image analysis.

In another illustrative embodiment, the repeating geometric sequence 245 may be a repeated geometric subdivision other than a fractal. Examples of non-fractal repeated geometric subdivisions are the Archimedean spiral and the spirograph. The Archimedean spiral (also known as the arithmetic spiral) is the locus of points corresponding to the locations over time of a point moving away from a fixed point with a constant speed along a line which rotates with constant angular velocity. Equivalently, in polar coordinates (r, θ) it can be described by the equation $r = \alpha + \beta\theta$, with real numbers $\alpha$ and $\beta$. Changing the parameter $\alpha$ will turn the spiral, while $\beta b$ controls the distance between successive turnings.

The spirograph is a type of curve variety technically known as hypotrochoids and epitrochoids. The spirograph may be mathematically determined in the following manner. Consider a fixed circle $C_1$ of radius R centered at the origin. A smaller circle $C_2$ of radius r<R is rolling inside $C_1$ and it is tangent to $C_1$. Assume that a point A that corresponds to a hole in the inner circle is located at the distance ρ<r from the center of $C_2$. Without loss of generality, assume that at the initial moment the point A is on the X-axis. In order to find the trajectory, we must follow A as the inner circle is set in motion.

Mark two points T on $C_1$ and B on $C_2$. The point T indicates where two circles are tangent all the time. Point B however will travel on $C_2$ and its initial location coincides with T. After setting $C_2$ in motion counterclockwise, a clockwise rotation with respect to its center is observed. The distance that point B traverses on the small circle is the same as the distance that the tangent point T travels on the large circle.

Consider the new (relative) system of coordinates x' and y' with its origin at the center of $C_2$ and its axes parallel to X and Y. Defining the parameter t as the angle by which the tangent point T rotates on $C_1$ and t' is the angle by which $C_2$ rotates (i.e., by which B travels) in the relative system of coordinates, then the distances traveled by B and T along their respective circles must be the same. Thus, $t R=(t-t') r$.

Let $(x_c, y_c)$ be the coordinates of the center of $C_2$ in the absolute system of coordinates. Then R−r represents the radius of the trajectory of the center of the inner circle, and $x_c=(R-r)\cos t$ and $y_c=(R-r)\sin t$.

The coordinates of A in the new system are x' and y' and they obey the regular law of circular motion (the angle of rotation in the relative system is t'): $x'=\rho \cos t'$ and $y'=\rho \sin t'$.

In order to obtain the trajectory of A in the absolute (old) system of coordinates, we add these two motions: $x=x'+x_c=(R-r)\cos t+\rho \cos t'$ and $y=y'+y_c=(R-r) \sin t+\rho \sin t'$, where $\rho$ is defined above.

Now we use the relation between t and t' as discussed above to obtain equations describing the trajectory of point A in terms of one parameter t: $x=x'+x_c=(R-r)\cos t+\rho \cos(R-r/r) t$ and $y=y'+y_c=(R-r)\sin t-\rho \sin(R-r/r)t$.

It is convenient to represent the equation above in terms the radius R of the largest circle and dimensionless parameters describing the structure of the spirograph. Namely, let $1=\rho/r$ and $k=r/R$.

The parameter $0 \leq 1 \leq 1$ represents how far the point A is located from the center of the inner circle. At the same time, $0 \leq k \leq 1$ represents how big the inner circle is with respect to the large one. We observe that $\rho/R=1k$. Therefore the trajectory equations take form of $x(t)=R[(1-k)\cos t+1k \cos(1-k/k)] t$ and $y(t)=R[(1-k)\sin t-1k \sin(1-k/k)]t$.

Returning to FIG. 2, the computing system 130 includes an application module 250. The application module 250 may receive or access the image data 150 from the access module 230 and the repeating geometric sequence 245 from the geometric sequence module 240. The application module 250 applies the repeating geometric sequence 245 to the image data 150 as is represented by element 254. In some illustrative embodiments, the repeating geometric sequence 245 may be applied to the image data 150 as the image data 150 is generated by the scanner 110 as previously described in relation to FIG. 1. In other illustrative embodiments, the repeating geometric sequence 245 may be applied to the image data 150 as it is stored in the database 140 as also previously in relation to FIG. 1.

Once the repeating geometric sequence 245 has been applied to the image data 150, the application module 250 may generate a series of coordinates 255 that represent the portion of the image data 150 that is defined by the variously oriented edges or sub-regions generated by the repeating geometric sequence 245. The series of coordinates 255 may include coordinates 255a, 255b, 255c and potentially any number of additional coordinates 255d as illustrated by ellipses in the application module 250. Generally, the series of coordinates 255 are X, Y coordinates, although this is not required. The series of coordinates 255 are used generate arrays of the image data 150 represented by the coordinates 255 as will be explained in more detail to follow.

For example, referring again to FIG. 3, the application module 250 may generate coordinates 255a that represent the portion of the image data 150 that is defined by the variously generated edge 310a. The application module 250 may also generate coordinates 255b that represent the portion of the image data 150 defined by the variously generated edge 310b and coordinates 255c that represent the portion of the image data 150 defined by the variously generated edge 310c.

Returning to FIG. 2, the computing system 130 includes an organization module 260. The organization module 260 may organize the portion of the image data 150 represented by the series of coordinates 255 into a set of one or more arrays 265. The arrays 265 may include an array 265a, an array 265b, an array 265c, and potentially any number of additional arrays 265d as illustrated by ellipses in the organization module 260.

The set of one or more arrays 265 may be provided to an analysis module 270 that is part of the computing system 130. The analysis module 270 performs image analysis on the portion of the image data 150 in the set of one or more arrays 265. In various embodiments, the image analysis may be a texture analysis or a material analysis. In such embodiments, the texture or material analysis may be performed using a Fourier transformation, a wavelet transformation, a gradient analysis, or a curve analysis. It will be understood that other forms of texture and material analysis may also be performed. In addition, image analysis other than a texture analysis or a material analysis may also be performed by the analysis module 270.

The image analysis produces an image analysis result 275. In those embodiments in which the image analysis is a texture analysis, the image analysis result 275 may be texture image analysis result. In those embodiments in which the image analysis is a material image analysis, the image analysis result 275 may be a material image analysis result. The image analysis result 275 can be used by the computing system 130 to create a visual representation of the object 120 and to allow a user of the computing system 130 to perform various actions on the visual representation.

In one illustrative embodiment, the computing system 130 may include a confidence module 280. The confidence module 280 may be used to determine a confidence level that the image analysis result 275 is valid. If the confidence module 280 determines that the confidence level is sufficient to show that that image analysis result 275 is valid, the image analysis process may be ended. On the other hand, if the confidence module 280 determines that the confidence level is not sufficient to show that the image analysis result 275 is valid, the image analysis process using the access module 230, the geometry sequence module 240, the application module 250, the organization module 260 and the analysis module 270 as described previously may be repeated until such a time as the confidence level is determined to be valid.

Ending the process when a sufficient confidence level is obtained provides computational savings, as the entire process need not be completed. In many conventional image analyses, ending the process partway leaves an area of the image unexplored by the image analysis, resulting in an unreliable result. Among other advantages, the embodiments described herein provide a mechanism that saves computational resources while still exploring enough of the image data to provide a reliable result.

In one illustrative embodiment, the confidence module 280 accesses an expected image analysis result 285. The expected image analysis result 285 may be a historical image analysis result that has previously been performed and then stored in the database 220. For example, the expected image analysis result may be a texture image analysis or a material image analysis that has previously been performed. Alternatively, the expected image analysis result 285 may be the result that is expected for a given texture analysis or material analysis algorithm such as a Fourier transformation, a wavelet transformation, a gradient analysis, or a curve analysis. These also may be stored in the database 220. The expected image analysis result 285 may be accessed from the database 220 or it may be accessed from another database, either internal or external to the computing system 130.

The confidence module 280 may then compare the image analysis result 275 with the expected image analysis result 285. If the comparison shows that the image analysis result 275 and the expected image analysis result 285 are sufficiently similar, the confidence module 280 determines that the confidence level is sufficient to show that the image analysis result 275 is valid. However, if the comparison shows that the image analysis result 275 and the expected image analysis result 285 are not sufficiently similar, the confidence module 280 determines that the confidence level is not sufficient to show that the image analysis result 275 is valid.

When the confidence module 280 determines that the confidence level is not sufficient, the application module 250 applies the repeating geometric sequence 245, incremented by an order of one, to the image data 150. A second series of coordinates 256 is thereby generated to represent the portion of the image data 150 that is defined by the variously oriented edges or sub-regions generated by the repeating geometric sequence 245 when it has been incremented by an order of one. The second series of coordinates 256 may include coordinates 256a, 256b, 256c and potentially any number of additional coordinates 256d as illustrated by ellipses in the application module 250.

The organization module 260 may organize the portion of the image data 150 represented by the second series of coordinates 256 into a second set of one or more arrays 266, which are one order higher than the set of one or more arrays 265. The second set of one or more arrays 266 may include an array 266a, an array 266b, an array 266c, and potentially any number of additional arrays 266d as illustrated by ellipses in the organization module 260.

The second set of one or more arrays 266 may be provided to the analysis module 270. The analysis module 270 then performs a second image analysis, such as texture analysis or material analysis, on the portion of the image data 150 in the second set of one or more arrays 266. The second image analysis may produce a second image analysis result 276. In an illustrative embodiment, the second image analysis using the second set of arrays 266 builds upon the first image analysis using the set of arrays 265. For example, the second image analysis continues the analysis started with the first set of arrays 265 by using the second set of arrays 266.

The confidence module 280 then determines a confidence level that the second image analysis result 276 is valid. If the confidence level indicates the second image analysis result 276 is valid, then the process may stop. However, if the confidence level shows that that second image analysis result 276 is not valid, then the process may be repeated as many times as needed until a sufficient confidence level is achieved. That is, the repeating geometric sequence 245 continues to be incremented by an order of one to generate a new series of coordinates. The image data represented by the new series of coordinates is organized into a new set of arrays and subjected to image analysis to produce an enhanced image analysis result. This continues until a sufficient confidence level is achieved.

Figure 4:
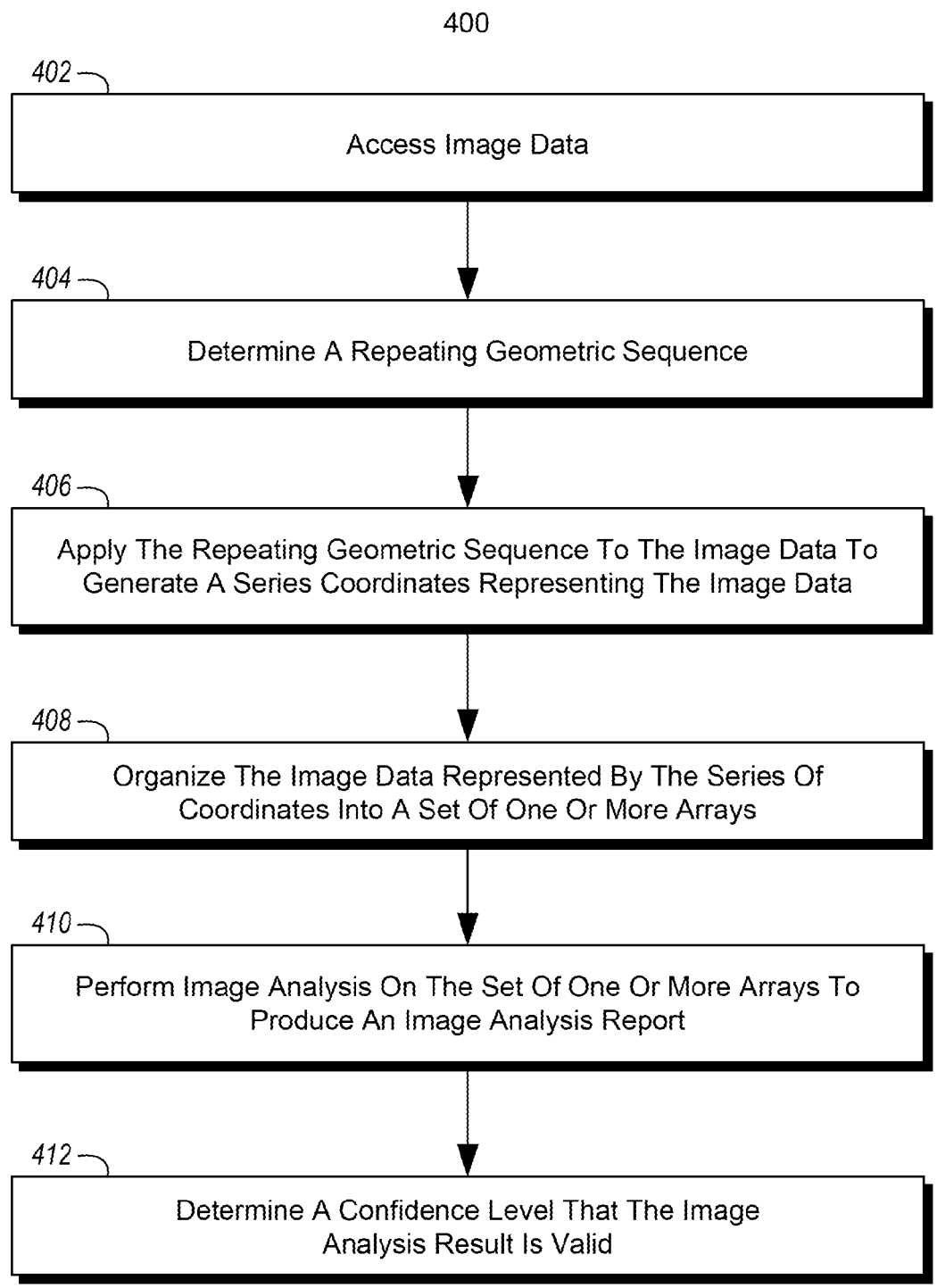
FIG. 4 is a flow diagram of an illustrative embodiment of a method for performing image analysis using a repeating geometric sequence.

FIG. 4 is a flow diagram of an illustrative embodiment of a method 400 for performing image analysis on image data using a repeating geometric sequence. In the illustrated embodiment, the method 400, and other methods and processes described herein, set forth various functional blocks or actions that may be described as processing steps, functional operations, events and/or acts, etc., which may be performed by hardware, software, and/or firmware. The method 400 includes one or more operations as illustrated by blocks 402, 404, 406, 408, 410, and/or 412. In block 402, image data that defines an image to be subjected to image analysis is accessed. For example, the access module 230 may access image data 150. The image data 150 may be accessed from the scanner 110 or the database 140 as previously described.

In block 404, a repeating geometric sequence that generates variously oriented edges or sub-regions in the image data is determined. For example, in one illustrative embodiment the geometric sequence module 240 may determine a repeating geometric sequence 245 that generates the variously oriented edges or sub-regions. In some embodiments, the repeating geometric sequence 245 may be a fractal pattern, such as that described in relation to FIG. 3.

In block 406, the repeating geometric sequence is applied to the image data to generate a series of coordinates representing the image data defined and determined by the variously oriented edges or sub-regions, and not by horizontal or vertical Cartesian lines. For example, in one illustrative embodiment, the application module 250 may apply the repeating geometric sequence 245 to the image data 150 to generate the series of coordinates 255. The repeating geometric sequence 245 defines a portion of the image data 150. For instance, as shown in FIG. 3, the variously oriented edges 310a, 310b, and 310c respectively define a portion of the image data that is then represented by the series of coordinates 255. As previously explained, the series of coordinates are determined by the variously oriented edges or sub-regions of the repeating geometric sequence 245. This is in contrast to conventional systems that define coordinates based on horizontal or vertical Cartesian lines.

In block 408, the image data represented by the series of coordinates is organized into a set of one or more arrays. For example, in one illustrative embodiment, the series of coordinates 255 may be organized into the set of arrays 265 by the organization module 260.

In block 410, image analysis on the set of one or more arrays to produce an image analysis result for the image data is performed. For example, in one illustrative embodiment the analysis module 270 may perform image analysis on the set of arrays 265 to produce image analysis result 275. In one embodiment, the image analysis is a texture analysis or a material analysis performed using a Fourier transformation, a wavelet transformation, a gradient analysis, or a curve analysis. Thus, the image analysis result 275 may be a texture image analysis result or a material image analysis result.

In block 412, the image analysis result is evaluated to determine a confidence level that the image analysis result is valid. For example, in one illustrative embodiment, the confidence module 280 evaluates image analysis result 275 to determine the confidence level, by comparing the image analysis result 275 with an expected image analysis result 285.

When the confidence module 280 determines that the confidence level is sufficient to show that the image analysis result 275 is valid, the image analysis may be ended. On the other hand, if the confidence level is not sufficient to show that the image analysis result 275 valid, the image analysis process may be repeated as necessary until a sufficient confidence level is achieved as previously described.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities).

A data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 5:
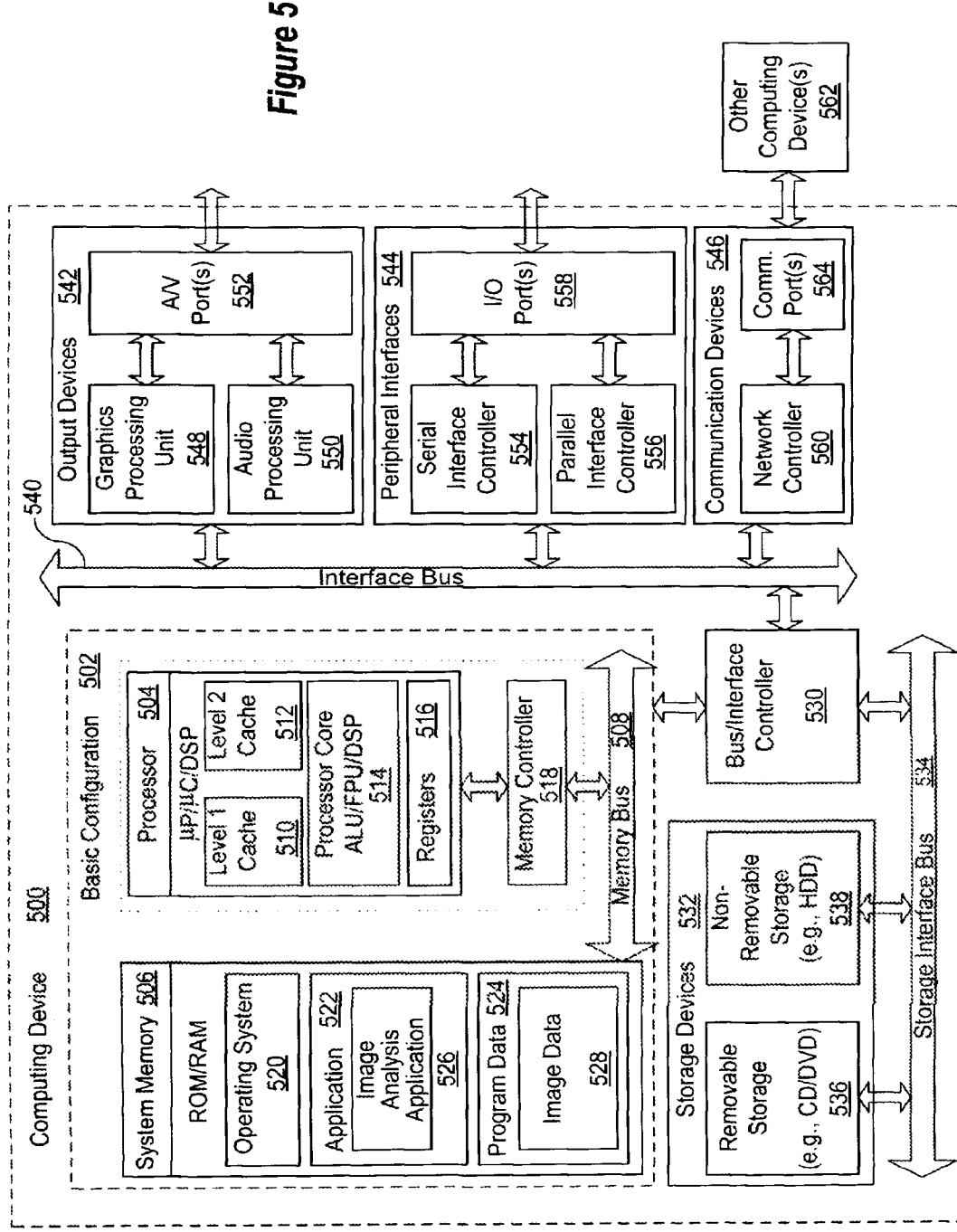
FIG. 5 shows an example computing device that can be used to perform image analysis using a repeating geometric sequence in accordance with the present disclosure.

FIG. 5 shows an example computing device 500 that is arranged for performing image analysis of image data using a repeating geometric sequence in accordance with the present disclosure. In a very basic configuration 502, computing device 500 generally includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an image analysis application 526 that is arranged to perform the functions as described herein including those described with respect to method 400 of FIG. 4. Program Data 524 may include image data 528 that may be useful for performing image analysis. In some embodiments, application 522 may be arranged to operate with program data 524 on operating system 520 such that the work performed by untrusted computing nodes can be verified as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. In a computing system including a processor and a memory, a method for performing image analysis of an image using a repeating geometric sequence, the method comprising:
   accessing, by the processor, image data that defines an image to be subjected to image analysis;
   determining, by the processor, a repeating geometric sequence configured to generate variously oriented edges or sub-regions in the image data, wherein the variously oriented edges or sub-regions are generated at angles that define lines or regions other than those that are determined solely by perpendicular axes in an orthogonal coordinate system;
   generating by the processor, based on an application of the repeating geometric sequence to the image data, a series of coordinates representing image data defined by the variously oriented edges or sub-regions, wherein the series of coordinates are defined by the variously oriented edges or sub-regions such that the series of coordinates are not limited to a horizontal or vertical Cartesian coordinate system;
   organizing, by the processor, the image data represented by the series of coordinates into a set of one or more arrays; and
   performing, by the processor, image analysis on the set of one or more arrays to produce an image analysis result for the image data.

2. The method of claim 1, further comprising:
   evaluating, by the processor, the image analysis result to determine a confidence level that the image analysis result is valid; and
   determining, by the processor, that the confidence level is sufficient to show that the image analysis result is valid, wherein, when the image analysis result is valid, the image analysis may be ended.

3. The method of claim 2, wherein determining the confidence level comprises comparing an expected image analysis result with the produced image analysis result.

4. The method of claim 1, further comprising:
   evaluating, by the processor, the image analysis result to determine a confidence level that the image analysis result is valid;
   determining, by the processor, that the confidence level is not sufficient to show that the image analysis result is valid;
   applying, by the processor, the geometric sequence to the image data to generate a second series of coordinates at different angles;
   organizing, by the processor, the second series of coordinates into a second set of one or more arrays;
   performing, by the processor, image analysis on the second set of one or more arrays to produce a second image analysis result; and
   evaluating, by the processor, the second image analysis result to determine a confidence level that the second image analysis result is valid.

5. The method of claim 1, wherein the repeating geometric sequence comprises a fractal pattern or other repeated geometric subdivision.

6. The method of claim 1, wherein the image analysis is one of a texture analysis or a material analysis performed using a Fourier transformation, a wavelet transformation, a gradient analysis, or a curve analysis.

7. The method of claim 6, wherein the image analysis result comprises one of a texture image analysis result and a material image analysis result.

8. The method of claim 1, wherein the image data is obtained from one of a scanner that defines scan lines corresponding to the repeating geometric sequence or from existing image data stored in a database subdivided into regions according to the repeating geometric sequence.

9. A non-transitory computer readable medium, for use in a computing system including a processor and a memory, for implementing a method for performing image analysis of an image, the non-transitory computer readable medium having stored thereon computer-executable instructions that, when executed by the processor, cause the computing system to:

access image data defining an image to be subjected to image analysis;

determine a repeating geometric sequence configured to generate variously oriented edges or sub-regions in the image data, wherein the variously oriented edges or sub-regions are generated at angles that define lines or regions other than those that are determined solely by perpendicular axes in an orthogonal coordinate system;

generate, based on an application of the repeating geometric sequence to the image data, a series of coordinates representing image data defined by the variously oriented edges or sub-regions, wherein the series of coordinates are defined by the variously oriented edges or sub-regions such that the series of coordinates are not limited to a horizontal or vertical Cartesian coordinate system;

organize the image data represented by the series of coordinates into a set of one or more arrays; and perform image analysis on the set of one or more arrays to produce an image analysis result for the image data.

10. The non-transitory computer readable medium of claim 9, wherein the computer-executable instructions, when executed by the processor, further cause the computing system to:

determine a confidence level that the image analysis result is valid; and determine that the confidence level is sufficient to show that the image analysis result is valid, wherein, when the image analysis result is valid, the image analysis may be ended.

11. The non-transitory computer readable medium of claim 10, wherein the determination of the confidence level comprises a comparison of an expected image analysis result with the produced image analysis result.

12. The non-transitory computer readable medium of claim 9, wherein the computer-executable instructions, when executed by the processor, further cause the computing system to:

determine a confidence level that the image analysis result is valid;

determine that the confidence level is not sufficient to show that the image analysis result is valid; apply the geometric sequence to the image data to generate a second series of coordinates at different angles;

organize the second series of coordinates into a second set of one or more arrays;

perform image analysis on the second set of one or more arrays to produce a second image analysis result; and evaluate the second image analysis result to determine a confidence level that the second image analysis result is valid.

13. The non-transitory computer readable medium of claim 9, wherein the repeating geometric sequence comprises a fractal pattern or other repeated geometric subdivision.

14. The non-transitory computer readable medium of claim 9, wherein the image analysis is one of a texture analysis or a material analysis performed using a Fourier transformation, a wavelet transformation, a gradient analysis, or a curve analysis.

15. The non-transitory computer readable medium of claim 14, wherein the image analysis result comprises one of a texture image analysis result and a material image analysis result.

16. The non-transitory computer readable medium of claim 9, wherein the image data is obtained from one of a scanner that defines scan lines corresponding to the repeating geometric sequence or from existing image data stored in a database subdivided into regions according to the repeating geometric sequence.

17. A computing system comprising:

a processor;

a memory;

an access module configured to access image data defining an image to be subjected to image analysis;

a geometric sequence module configured to determine a repeating geometric sequence configured to generate variously oriented edges or sub-regions in the image data, wherein the variously oriented edges or sub-regions are generated at angles that define lines or regions other than those that are determined solely by perpendicular axes in an orthogonal coordinate system;

an application module configured to apply the repeating geometric sequence to the image data to generate, at different angles, based on the application of the repeating geometric sequence, a series of coordinates representing image data defined by the variously oriented edges or sub-regions, wherein the series of coordinates are defined by the variously oriented edges or sub-regions and not by horizontal or vertical Cartesian lines;

an organization module configured to organize the image data represented by the series of coordinates into a set of one or more arrays; and an analysis module configured to perform image analysis on the set of one or more arrays to produce an image analysis result for the image data.

18. The computing system of claim 17, wherein the repeating geometric sequence comprises a fractal pattern or other repeated geometric subdivision.

19. The computing system of claim 17, wherein the image analysis is one of a texture analysis or a material analysis performed using a Fourier transformation, a wavelet transformation, a gradient analysis, or a curve analysis.

20. The computing system of claim 17, wherein the image data is obtained from one of a scanner that defines scan lines corresponding to the repeating geometric sequence or from existing image data stored in a database subdivided into regions according to the repeating geometric sequence.

\* \* \* \* \*

UNITED STATES PATENT AND TRADEMARK OFFICE
CERTIFICATE OF CORRECTION

PATENT NO. : 8,422,792 B2  
APPLICATION NO. : 13/003717  
DATED : April 16, 2013  
INVENTOR(S) : Kruglick Page 1 of 2

It is certified that error appears in the above-identified patent and that said Letters Patent is hereby corrected as shown below:

Title Page

Item (56), under "OTHER PUBLICATIONS", in Column 2, Lines 3-5, delete "al "Multi-bands image analysis using local fractal dimension" Computer Graphics and Image Processing, Brazilian Symposium on," and insert -- al., "Multi-bands image analysis using local fractal dimension," Proceedings of the XIV Brazilian Symposium on Computer Graphics and Image Processing, --, therefor.

Item (56), under "OTHER PUBLICATIONS", in Column 2, Line 7, delete "al" and insert -- al., --, therefor.

In the Drawings:
Delete Drawing Sheet 5 of 5, and replace with Drawing Sheet 5. (Attached)

In the Specifications:
In Column 5, Line 23, delete "Harter-Highway" and insert -- Harter-Heighway --, therefor.

In Column 7, Lines 42-43, delete

" $x(t)=R[(1-k)\cos t + 1k \cos(1-k/k) t$ and $y(t)=R[(1-k)\sin t - 1k \sin(1-k/k)t.$ " and insert -- $x(t)=R[(1-k)\cos t + 1k \cos(1-k/k)t]$ and $y(t)=R[(1-k)\sin t - 1k \sin(1-k/k)t].$ --, therefor.

In Column 15, Line 38, delete "or," and insert -- or --, therefor.

Signed and Sealed this  
Third Day of September, 2013

Teresa Stanek Rea  
*Acting Director of the United States Patent and Trademark Office*